(12) United States Patent
Veeraraghavan et al.

(10) Patent No.: US 10,095,440 B2
(45) Date of Patent: Oct. 9, 2018

(54) REDO-LOGGING FOR PARTITIONED IN-MEMORY DATASETS

(71) Applicant: Huawei Technologies Co., Ltd., Shenzhen (CN)

(72) Inventors: Vinoth Veeraraghavan, Shenzhen (CN); Kalyan Sivakumar, Bangalore (IN); Antonios Iliopoulos, Munich (DE); Shay Goikhman, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/410,522

(22) Filed: Jan. 19, 2017

(65) Prior Publication Data

US 2017/0131911 A1     May 11, 2017

Related U.S. Application Data

(63) Continuation of application No. PCT/EP2016/057437, filed on Apr. 5, 2016.

(30) Foreign Application Priority Data

Apr. 8, 2015   (EP) ................. EP15162701

(51) Int. Cl.
 *G06F 12/00* (2006.01)
 *G06F 3/06* (2006.01)
 *G06F 11/14* (2006.01)

(52) U.S. Cl.
 CPC ............ *G06F 3/065* (2013.01); *G06F 3/0619* (2013.01); *G06F 3/0656* (2013.01);
(Continued)

(58) Field of Classification Search
 CPC ...... G06F 13/385; G06F 3/061; G06F 3/0614; G06F 3/0635; G06F 3/064; G06F 3/0656; G06F 3/0659; G06F 3/0689
(Continued)

(56) References Cited

U.S. PATENT DOCUMENTS

| | | |
|---|---|---|
| 5,864,849 A | 1/1999 | Bohannon et al. |
| 6,490,594 B1 | 12/2002 | Lomet |

(Continued)

FOREIGN PATENT DOCUMENTS

| | | |
|---|---|---|
| EP | 3079060 A1 | 10/2016 |
| EP | 3079064 A1 | 10/2016 |

(Continued)

OTHER PUBLICATIONS

Park et al., "Failure-Atomic msync (): A Simple and Efficient Mechanism for Preserving the Integrity of Durable Data," ACM, Prague, Czech Republic (Apr. 15-17, 2013).

(Continued)

*Primary Examiner* — Mardochee Chery
(74) *Attorney, Agent, or Firm* — Leydig, Voit & Mayer, Ltd.

(57) ABSTRACT

A data storage device is provided, comprising a control module a first storage module a second storage module a third storage module and a buffer. The first storage stores a plurality of data sets. The control module receives requests for operations to be carried out on the plurality of data sets in the first storage module, executes the received requests and copies the plurality of data sets in the first storage module to the second storage module at a predetermined time. The control module further adds the received requests for operations to the buffer and persists the buffer to the third storage module by a synchronization means. The data storage device initializes the plurality of data sets in the first (Continued)

storage module from the second storage module and carries out operations corresponding to the requests from the third storage module in a recovery scenario.

18 Claims, 6 Drawing Sheets

(52) U.S. Cl.
CPC .......... G06F 3/0659 (2013.01); G06F 3/0683 (2013.01); G06F 11/1438 (2013.01); G06F 11/1471 (2013.01); *G06F 2201/80* (2013.01); *G06F 2201/805* (2013.01); *G06F 2201/82* (2013.01)

(58) Field of Classification Search
USPC ........................................................ 711/162
See application file for complete search history.

(56) References Cited

U.S. PATENT DOCUMENTS

| 7,577,806 | B2 | 8/2009 | Rowan et al. |
| 8,099,627 | B1 | 1/2012 | Shah et al. |
| 8,676,750 | B2* | 3/2014 | Bitar ................... G06F 11/2058 707/610 |
| 2011/0208694 | A1 | 8/2011 | Bitar et al. |
| 2011/0252194 | A1* | 10/2011 | Matsui ................. G06F 1/3221 711/114 |

FOREIGN PATENT DOCUMENTS

| RU | 2146399 C1 | 3/2000 |
| RU | 2441273 C2 | 1/2012 |
| WO | 9424673 A1 | 10/1994 |
| WO | 2007112009 A1 | 10/2007 |

OTHER PUBLICATIONS

Cao et al., "Fast Checkpoint Recovery Algorithms for Frequently Consistent Applications," ACM, Athens, Greece (Jun. 12-16, 2011).
Knuth, "The Art of Computer Programming," Fundamental Algorithms, vol. 1, California Institute of Technology (1968).
"Dirty bit," Wikipedia, p. 1 (last edited May 30, 2017).

* cited by examiner

REDO-LOGGING FOR PARTITIONED IN-MEMORY DATASETS

CROSS-REFERENCE TO RELATED APPLICATIONS

This application is a continuation of International Application No. PCT/EP2016/057437, filed on Apr. 5, 2016, which claims priority to European Patent Application No. EP15162701.5, filed on Apr. 8, 2015. The disclosures of the aforementioned applications are hereby incorporated by reference in their entireties.

TECHNICAL FIELD

The embodiments of present invention relate to the technical field of data storage, particularly to a data storage device, for example a computer device for storing and managing particularly large amounts of data and for providing these data to a client for read or write operations.

BACKGROUND

Large in-memory databases are currently being used on production bases to serve as key-value stores, online transaction processing (OLTP) databases, large-scale web applications, massive online multi-player games, software defined networks (SDN) controller network views, scientific simulation, etc. These applications are built to sustain high transaction rates using multiple execution contexts, e.g., threads in non-uniform memory access (NUMA) shared-everything architectures, whereby the dataset is logically partitioned and each partition is associated with an execution context which is responsible to process transactions on its partition.

Checkpointing and logical redo log may be used in in-memory datasets to enable dataset recovery in case of system failure. The durability of update transactions is provided by a periodic checkpointing process that flushes a consistent instantaneous state to a persistent storage, and a logical redo log that records all the modification requests between consecutive checkpoints. After a system failure, a restore process uses the latest persistent checkpoint to initialize the memory state, and a replay procedure to replay the redo log to re-create the application state at the point before the time of the failure.

The design of the redo-logging, in face of the dataset high update rates, remains a continuing challenge for the database designers. Redo-logging is tightly coupled with the checkpointing. The checkpointing process must be low-overhead and highly efficient in order to support high update rates, and the frequent checkpointing in order to reduce the redo log size and its associated log replay duration at restore-time. Since checkpoints run repeatedly, an incremental checkpointing may usually be utilized whereby only objects changed since the previous checkpoint are detected and persisted.

Logical redo logging usually persists the modification requests to the dataset while these modifications take effect in the in-memory data set. As the rate of updating a persistent storage device is usually significantly lower than updating memory, there may be a tension between slowing down the transaction processing in favor of persisting a more complete log of these transactions.

Tuan Cao et al.: "Fast Checkpoint Recovery Algorithms for Frequently Consistent Applications", SIGMOD'11. June 2011, Athens, Greece describes an approach utilizing special-purpose storage devices in favor of enabling the logging of transaction in full memory speed.

SUMMARY

It is an object of the embodiments of the invention to provide a data storage device which reduces the intrusion afflicted on the transaction processing during redo-logging related to a dataset.

This object is solved by the subject matter of the independent claim. Further embodiments are stated in the dependent claims and in the following description.

According to an aspect of the embodiments of the invention, a data storage device is provided, comprising a control module, a first storage module, a second storage module, a third storage module and a buffer. The first storage module is configured to store a plurality of data sets and the control module is configured to receive requests for operations to be carried out on the plurality of data sets in the first storage module, to execute the received requests and to copy the plurality of data sets stored or contained in the first storage module to the second storage module at a predetermined time. The control module is further configured to add the received requests for operations to the buffer and to persist the buffer to the third storage module by a synchronization means. The data storage device is configured to initialize the plurality of data sets in the first storage module from the second storage module and to carry out operations corresponding to the requests from the third storage module in a recovery scenario.

The control module referred to herein may be a processor or a central processor unit of the data storage device, for example any kind of computer adapted to provide a dataset-service to a plurality of requesting devices or clients. The first storage module may be a non-persistent memory and the second storage module may be a persistent memory, for example a hard disk or any other kind of persistent memory unit. The buffer contains all lists used for the request entries and the redo log. A data set may be referred to a stripe comprising at least one key-value entry.

The control unit may be configured to assign a direct correlation between the buffer and the third storage module. For example, the buffer may be mapped to the third storage module, for example assigning a direct byte-for-byte correlation of the buffer with the third storage module. For mapping the buffer to the third storage module, an appropriate function of the operating system of the data storage device may be used, for example the mmap( ) function of a Unix system. A mapped or memory-mapped section may particularly be a memory section of a storage module that can be directly referenced through a pointer or file descriptor. Such a byte-for-byte correlation can then be used by another functional unit, for example any one of the modules of the data storage device, as if it were a memory section of the respective module. Persisting the buffer to the third storage module may be done by a system call, for example.

In a recovery scenario, the stored requests which are not processed or executed are replayed. For example, in case of a failure and a subsequent recovery of the first storage module from the second storage module, the requests stored in the third storage module are carried out (=replayed) on the first storage module in order to initialize the data at the point of the failure or system crash.

The second storage module contains the checkpoint, which has been described above and the third storage module contains the redo log file. The buffer contains the redo log buffer mmaped to the file. The storage modules and the buffer may be sections of one and the same physical memory device.

The second storage module may be configured to contain a persistent copy of a consistent state of the plurality of data sets at a predetermined time from the first storage module. The control module may be configured to assign the buffer a direct correlation with the third storage module.

Such a data storage device enables that the request buffer is used for updating the content of the third storage module. Particularly, the same memory cells are used for the request and log entries such that the redo log has not be written in separate memory cells. Thus, writing operations of a separate redo log are not required any more.

According to an embodiment of the invention, the second storage module is configured to contain a persistent copy of a consistent state of the plurality of data sets at a plurality of predetermined points in time from the first storage module.

The persistent copy may be created at periodically repeating points in time with a constant or varying time gap in between. The second storage module may contain one copy only which is replaced with the new copy at each time of an updating process or it may contain more than one copy from the last N updating processes, wherein N can be constant and the oldest copy is overwritten.

According to a further embodiment of the invention, the control module is configured to receive requests for operations to be carried out on the plurality of data sets in the first storage module, to execute the received requests and to copy the plurality of data sets in the first storage module to the second storage module at a plurality of subsequent predetermined points in time.

The plurality of data sets in the first storage module may be copied to the second storage module periodically and repeatedly with constant or varying time gaps between subsequent copying processes.

According to a further embodiment of the invention, the buffer is a circular buffer.

Thus, the request entries are written to the buffer starting at an arbitrary offset and wrap around the beginning of the buffer. The size of the buffer can be limited to a predetermined value.

According to a further embodiment of the invention, the buffer is configured to use same buffer cells for adding the received requests for operations to be carried out on the first storage module and for updating the third storage module.

Thus, no copy in the buffer is required for holding the log file, as the same cells in the buffer are used for request entries and log entries.

According to a further embodiment of the invention, the control module is configured to mark the requests for operations carried out on the data sets in the first storage module which have been used for updating the third storage module.

Marking a request may occur by using a pointer to a memory cell or logical memory position which contains a request or by using a flag identifying one request which has been carried out on the disk.

Thus, the request entries which have been written to or which have been used to update the third storage module can be overwritten in the ring buffer. Request entries which are not marked cannot be overwritten as these entries are required for updating the second storage module.

According to a further embodiment of the invention, the control module is configured to repeatedly update the data sets in the second storage module.

Thus, the period between consecutive updating processes can be adapted such that a size of the buffer and the time required for updating the second storage module can be optimized, particularly reduced. Further, the updating speed of the second storage module may be considered, particularly when writing operations on the second storage module is time-consuming due to physical writing operations on a persistent memory like a disk.

According to a further embodiment of the invention, the control module is configured to verify if an updating of the data sets in the second storage module is successful and to not mark the respective requests as updated in the second storage module in case the updating is not successful.

In other words, only those request entries which have been updated to the second storage module are marked as updated, otherwise those requests are updated in the subsequent update step.

According to a further embodiment of the invention, the data storage device is configured to update only those data sets in the second storage module on which an operation in the first storage module has been carried out. That is, only those data sets in the second storage module are updated, which have been object to an operation in the first storage module.

This embodiment relates to incremental updating and may reduce overhead as only the changed data sets in the memory are updated on the disk.

According to a further embodiment of the invention, the first storage module is a non-persistent storage module.

The first storage module may for example be a random access memory, RAM, adapted for storing in-memory databases and providing access to the database to requesting devices.

In this embodiment, the first storage module which is a non-persistent storage module enables efficient read/write operations and thus may increase the system performance.

According to a further embodiment of the invention, the third storage module is a persistent storage module, for example a hard disk or a solid state disk or any other kind of persistent storage device.

In this embodiment, the third storage module is updated with the amendments to the data sets in the first storage module. As the duration for operations on a disk drive is higher than on a RAM, such a system is optimized for both, data safety and high efficiency.

According to a further embodiment of the invention, the first storage module is configured to assign the plurality of data sets to a plurality of data set groups, wherein the data storage device comprises a plurality of buffers and wherein each one of the plurality of buffers is assigned to one data set group, respectively.

In other words, the first storage module contains an in-memory database. In this embodiment, each data set group or partition has been assigned one buffer such that the requesting, logging of requests and updating can be carried out individually for each one of the plurality of data set groups.

According to a further embodiment of the invention, the data storage device is configured to restore the plurality of data sets in the first storage module based on the data sets of the second storage module and the requests contained in the third storage module.

Thus, restoration after a system failure is enabled.

According to a further embodiment of the invention, only those of the requests contained in the third storage module are applied to the data sets in the first storage module which have not been updated to the second storage module.

In other words, the data storage device as described herein proposes a technique of redo log design, whereby less intrusion is afflicted on the transaction processing, less support is required from the file system, and thus more redo-log entries are captured on the disk. A special thread model may be utilized that applies the separation of concern principle between the transaction execution and the log processing. By doing so, significant redo log processing efficiency may be gained.

One aspect of the data storage device may be described as utilizing the decoupling between the working threads that execute requests in a key-value store, and the communication threads that pass request buffers to the working threads. As the request buffer is used to contain the request specification, and that exactly specification is needed to be saved in the redo log, an approach is described that reads the request specification directly into the redo log entry, and then pass a reference to that entry for the execution. Moreover, by the use of memory mapped file to place the redo log entries a true zero-copy design along the entire processing path is achieved.

Thus, this approach eliminates the need to copy request specification for execution, redo log and a file output. Thus, a truly zero-copy request specification design is employed. Further, the intrusion imposed on the working threads by redo log processing may be minimized and a redo log page for multiple redo log entries is privatized, thereby minimizing synchronization with the so called FreeList. The FreeList is a list having a configurable size as follows: it defines the maximal number of redo entries that might be lost as the result of system failure and it defines the frequency of the synchronization system call.

The approach described above may utilize a memory-mapped file API for file flushing, therefore requires only minimal file system overhead and may leverages the failure-atomic msync( ) support to provide failure oblivious consistency guarantees.

Combining these properties, the described redo log approach may particularly have low overhead and may be highly efficient thereby enabling processing more requests and storing more complete logs in shorter times.

BRIEF DESCRIPTION OF THE FIGURES

Embodiments of the invention will be described with respect to the following figures, in which.

DETAILED DESCRIPTION OF EMBODIMENTS

Figure 1:
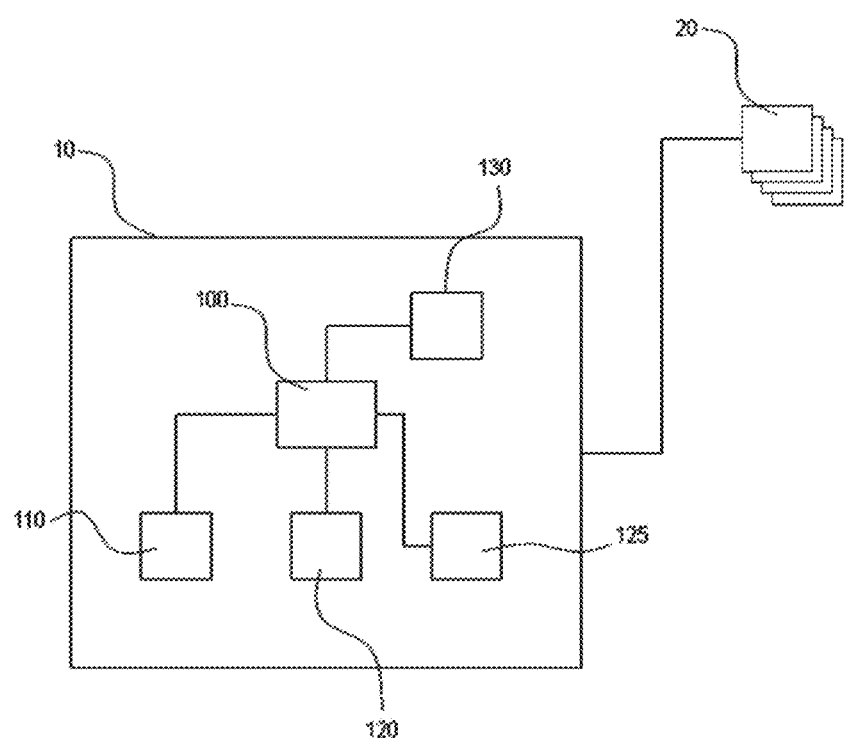
FIG. 1 schematically shows a data storage device according to an exemplary embodiment of the invention connected to a plurality of requesting devices.

FIG. 1 shows a data storage device 10 with a control module 100, a first storage module 110, a second storage module 120, a third storage module 125 and a buffer 130, wherein the data storage device 10 is communicatively connected to one or more requesting devices 20, which may be referred to as clients. The data storage device may also be referred to as server.

The control module 100, the storage modules 110, 120, 125 and the buffer are configured to carry out the functions as described above and hereinafter.

Figure 2:
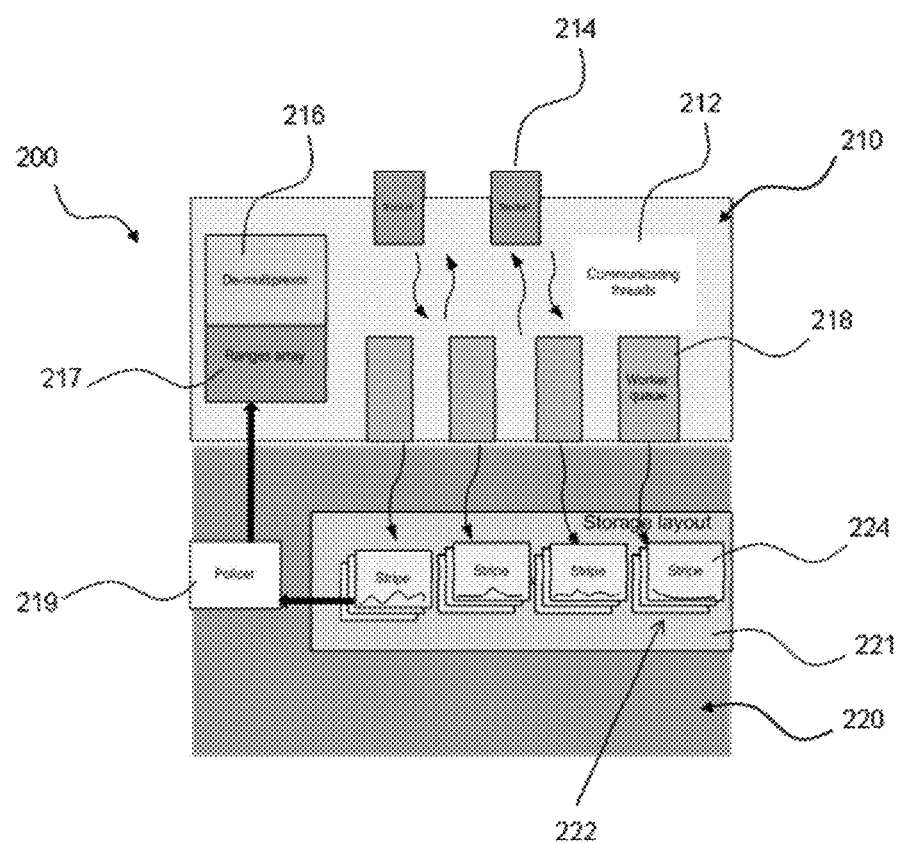
FIG. 2 schematically shows a key-value store thread model of a data storage device according to an exemplary embodiment of the invention.

FIG. 2 shows a common key-value store thread model 200 which may be used by the data storage device 10 for handling data requests from the requesting devices 20 and for managing the data stored in the storage modules. The Storage Layout abstraction 221 designates sets of stripes 224, each stripe representing an aggregate of rows of some table defined in the key-value store, to a plurality of data partitions 222. The key-value store operation processing is divided between the Front End (FE) 210 and the Back End (BE) 220. A set of working queues 218, each comprising a pair of operation request queue and its response queue, are the main interface between the FE 210 and the BE 220. Each queue is associated with a BE working thread.

The FE 210 comprises a set of communication threads 212, and a De-multiplexor 216. The de-multiplexor 216 is used to parse the request and to determine the specific queue to enqueue the request on. Preferably, the FE 210 comprises further a Ranges-Array 217, which is configured to associate a disjoint (sub-)set of stripes of each working queue 218 and is used for de-multiplexing. The communication threads 212 read the communication sockets obtaining requests, determine the target queues using the De-multiplexor 216, and posts the request on the request queues. In the reverse direction, the communicating threads read response queues and deliver the responses to the associated sockets 214.

The BE 220 comprises a set of working threads, and for each thread, a corresponding set of stripes 224 that can come from different tables, called partition 222. The distribution of all the stripes to partitions and the assignment of the threads to partitions determine the partitioning.

Preferably, the BE 220 comprises a Policer 219, which is configured to update the Ranges-Array to redistribute the request among the queues, in order to adapt better to the perceived load.

A working thread de-queues a request from its request queue, executes it on one of the stripes in its partition and posts the response on its response queue.

A communication thread 212 reads a set of network sockets 214, receives transaction requests, determines the target queues using De-multiplexor 216 and posts the requests on the request queues. In the reverse direction, a communicating thread 212 reads response queues, delivers the responses to the associated sockets 214, and returns the freed request/response buffer to the free-list.

The communication thread 212 uses a free list of pre-allocated request/response buffers, associated with the work queue to avoid copying the requests' and responses' data. That idea further utilized for the redo logging. Namely, as the request buffer is used to contain the request specification, and that exactly specification is saved in the redo log, a method is devised that reuses the specification for the two purposes, and by the use of memory mapped file achieves a true zero-copy design.

Figure 3:
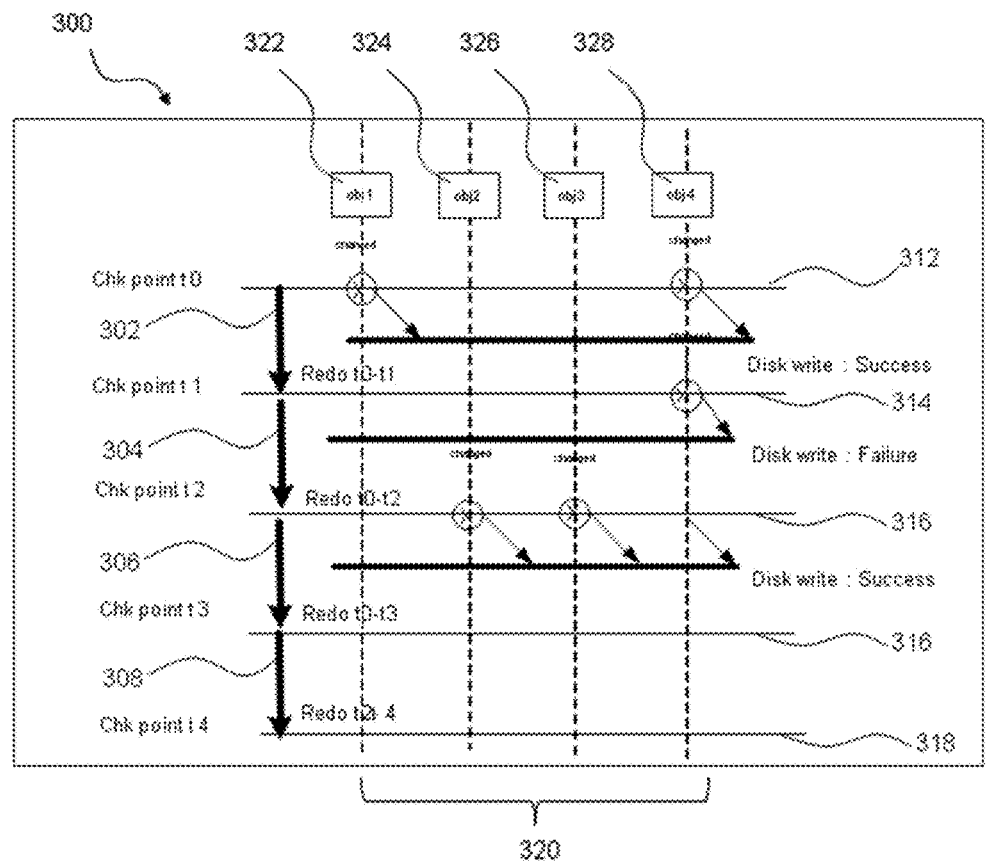
FIG. 3 schematically shows a redo log file of a data storage device according to an exemplary embodiment of the invention.

FIG. 3 illustrates the content of the redo log file 300 in time. The vertical arrows 302, 304, 306 represent the recording of all the modification requests that occur between the times specified on the arrow's label, namely between two subsequent points of time t0, t1, t2, t3, respectively.

At t0 snapshot of t0 state is captured, and redo-log is started. At t1, a successful checkpoint of t0, and redo t0-t1 are available. At t2 the checkpoint of t1 fails, so the redo-log needs to include all the entries of t0-t2.

At t3 the checkpoint of t2 is successful, so at t3 the redo-log is purged to include only the entries from t2-t3.

FIG. 3 illustrates an example of checkpointing and redo log processing across multiple consecutive checkpoint intervals 312, 314, 316, 318 in order to describe the logical relationship between the redo logging and the checkpointing.

A set of threads is depicted (aligned next to each other from the left to the right and indicated by vertical dashed lines) that continuously modify a set of memory-resident objects. At a checkpoint time, a consistent snapshot of the memory content 320 is taken, and the objects 322, 324, 326, 328 in the snapshot which are modified relatively to the last successful checkpoint, called the change set, are flushed to the disk, i.e. to the second storage module 120. The memory content 320 is stored in the first storage module 110.

If the last checkpoint (t[n−1]) was not successful, the change set for the current (tn) and last checkpoint (t[n−1]) are unified (combined). Different methods can be used to detect and manage change sets.

Logical redo log provides a consistent recording of the modification operations requests on the dataset that are later captured in the change sets at the checkpointing. Therefore, the redo log files are started and purged relatively to the last successful checkpoint interval time.

The zero-copy redo logging approach of the data storage device 10 enables minimal file system overhead. This approach defines a logger unit that manages a logger thread and a communication thread which are configured to carry out the functions of the control unit 110 of the data storage device 10 and which will be explained with reference to the following figures.

Figure 4:
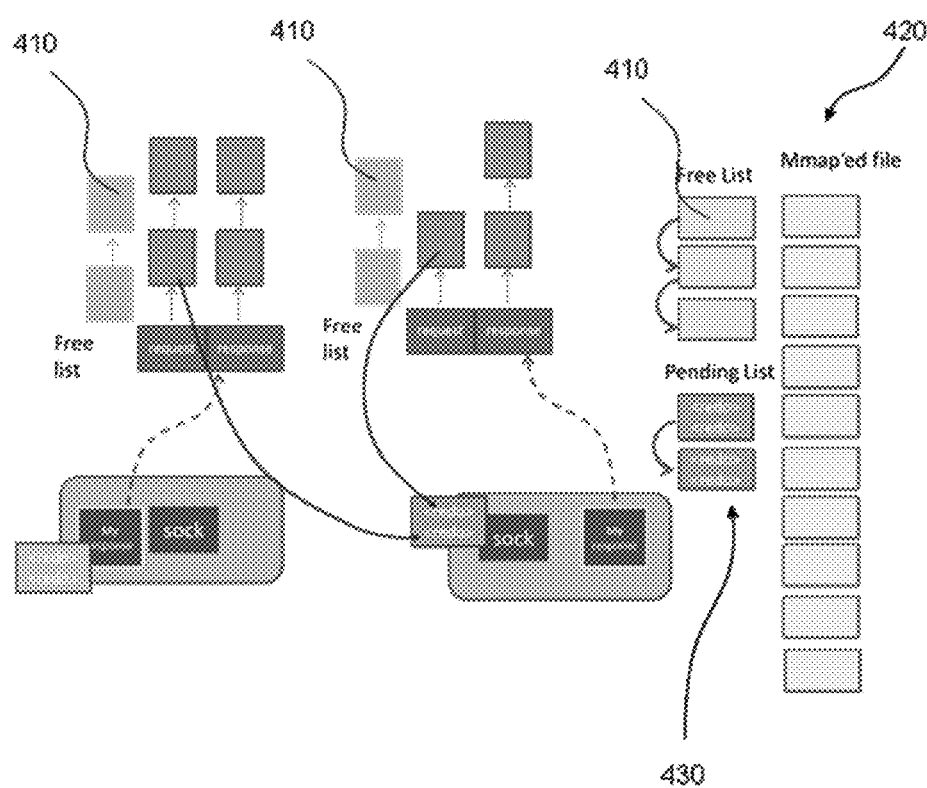
FIG. 4 schematically shows communication threads each having its private redo log according to an exemplary embodiment of the invention.

FIG. 4 shows the interaction and/or communication between both threads. The communication occurs over the FreeList 410 mentioned above. The logger thread places pages to the FreeList, the communication thread reads pages from the FreeList.

A memory mapped file 420 is used for holding the redo-log of maximal needed size, with a number of entries sufficient to support a configured number of checkpoint failures. The log in the file is "circular" meaning that log starts at arbitrary offset and wraps around the beginning of the file. The offset of the first logical entry is saved in the corresponding checkpoint file. Different redo-log files may be placed on different disks.

The file's address space is divided into redo-pages (a redo page may be a multiple of operating system, OS, pages) and the space is partitioned to SavedPages and AvailablePages address ranges. The SavedPages represents the range where active redo-log entries are kept. AvailablePages are the pages which are available to store the next redo entries. A FreeList of redo pages, mapped in the AvailablePages, comprises pages that a communication thread can allocate and privatize. The size of the FreeList determines the amount of data ready to lose in case of a system crash. When the FreeList is exhausted the communication thread loops waiting till it is replenished.

A PendingList 430 of redo pages contains a list of pages that are waiting to be processed by the logger thread. If the pages in PendingList are only partially filled, the logger thread may combine all the redo-log entries into a smaller number of pages which it will actually persist. The logger thread persists the pages in PendingList by means of synchronous msync( ) system call. While the msync( ) is done on a page, its address is added to the SavedPages; the logger retrieves a new page from the AvailablePages and places the page to the FreeList.

Upon receiving an update transaction, a communication thread uses its private redo page (allocated from the FreeList of a logger unit), formats a redo entry at the current offset in the page and reads in the transaction's parameters from the network socket into the redo entry. Then it stores the pointer to the redo entry in the request/response buffer, and pushes the request buffer onto a request queue.

When the request arrives to the working thread, the thread reads the redo-entry, executes it and stores the response status in the redo-entry. As the communication thread serves all possible working threads, there may be scenarios where different threads update the same row, e.g., after re-computing the association of working threads to partitions. Thus an update on the same row might appear in different redo log files. The working thread, therefore, inserts an ordering counter of the row's transaction number in the redo-log entry.

When the page is full, or upon an expiration of a configured redo-log flush interval Tr, the communication thread validates that the relevant working threads have processed their redo-log entries in the page. The thread can read the relevant working thread last entry in the page for its completion status. The communication thread then enqueues the page on the PendingList 430 and allocates a new page form the FreeLIst 410. The Tr interval is configured such that in a low workload update rate scenario the logger thread persists the PendingList on time without the communication thread having to wait for the FreeList replenishment.

The communication and logger thread may poll the beginning and the end of the checkpoint process. At the beginning of the checkpoint the communication thread adds a special marker in the page before the redo-log entry for the new checkpoint. The offset of this marker is saved in the corresponding checkpoint file. The logger thread detecting the successful completion of the last checkpoint moves the pages in the SavedPages corresponding to the redo log entries that the recent checkpoint covers, to the AvailablePages.

After a system failure, a restore process uses the latest persistent checkpoint to initialize the memory state, and the Replay procedure, to replay the redo log to re-create the application state a point before the time of the failure. The Replay procedure scans in parallel the redo-log files from the offsets saved in checkpoint file and applies the transactions specified in redo entries to the in-memory dataset state.

As a row redo entries may be scattered across multiple files, the Replay procedure may maintain a threaded binary tree for the row to absorb the out-of-order encountered entries. When the next in the order redo entry is encountered, it is processed immediately, and after it, all the following entries in the tree.

The FreeList 410 and the memory mapped file 420 particularly point to the same physical memory address such that an additional redo-log copy is not required.

Figure 5:
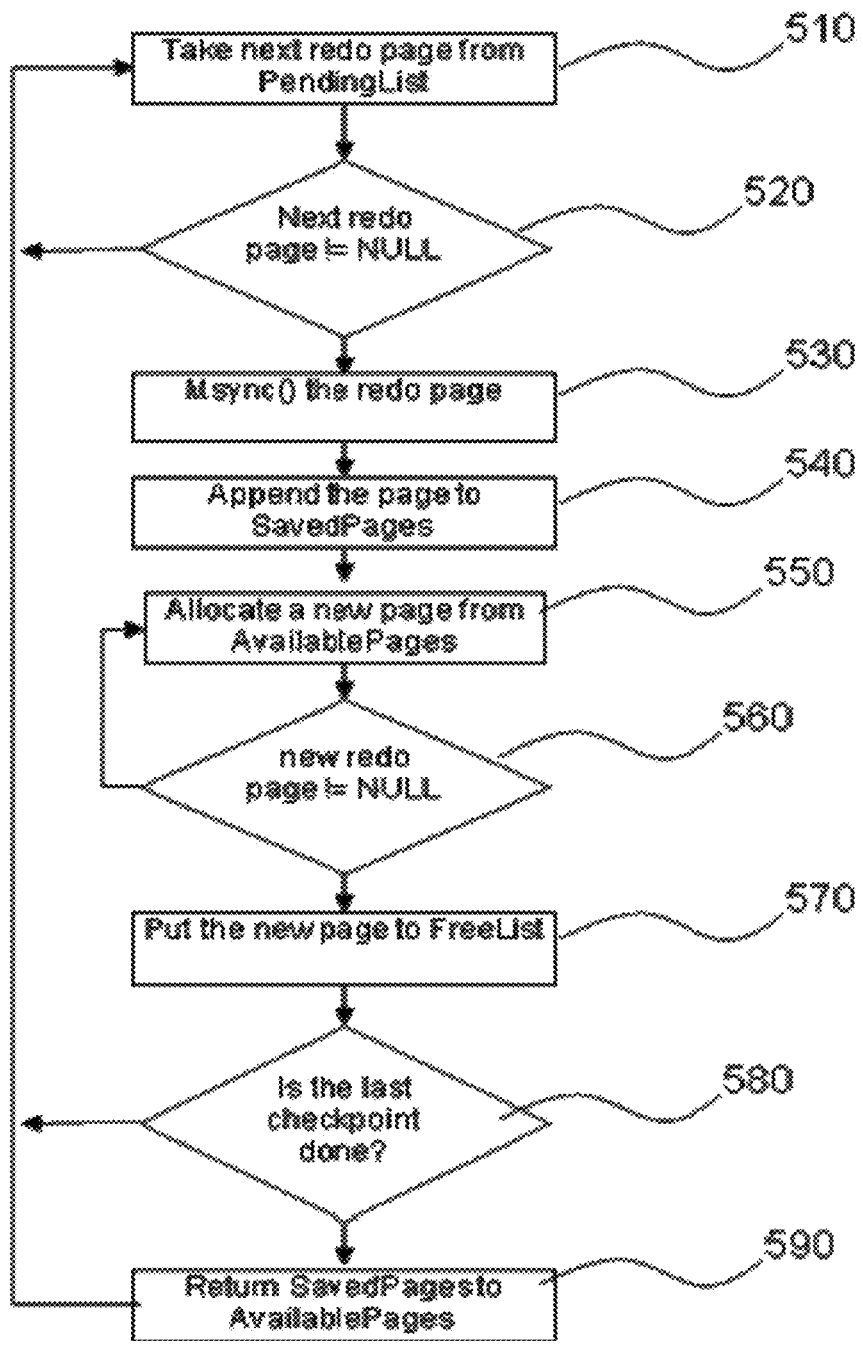
FIG. 5 schematically shows the processing of a logger unit in a data storage device according to an exemplary embodiment of the invention.
Figure 6:
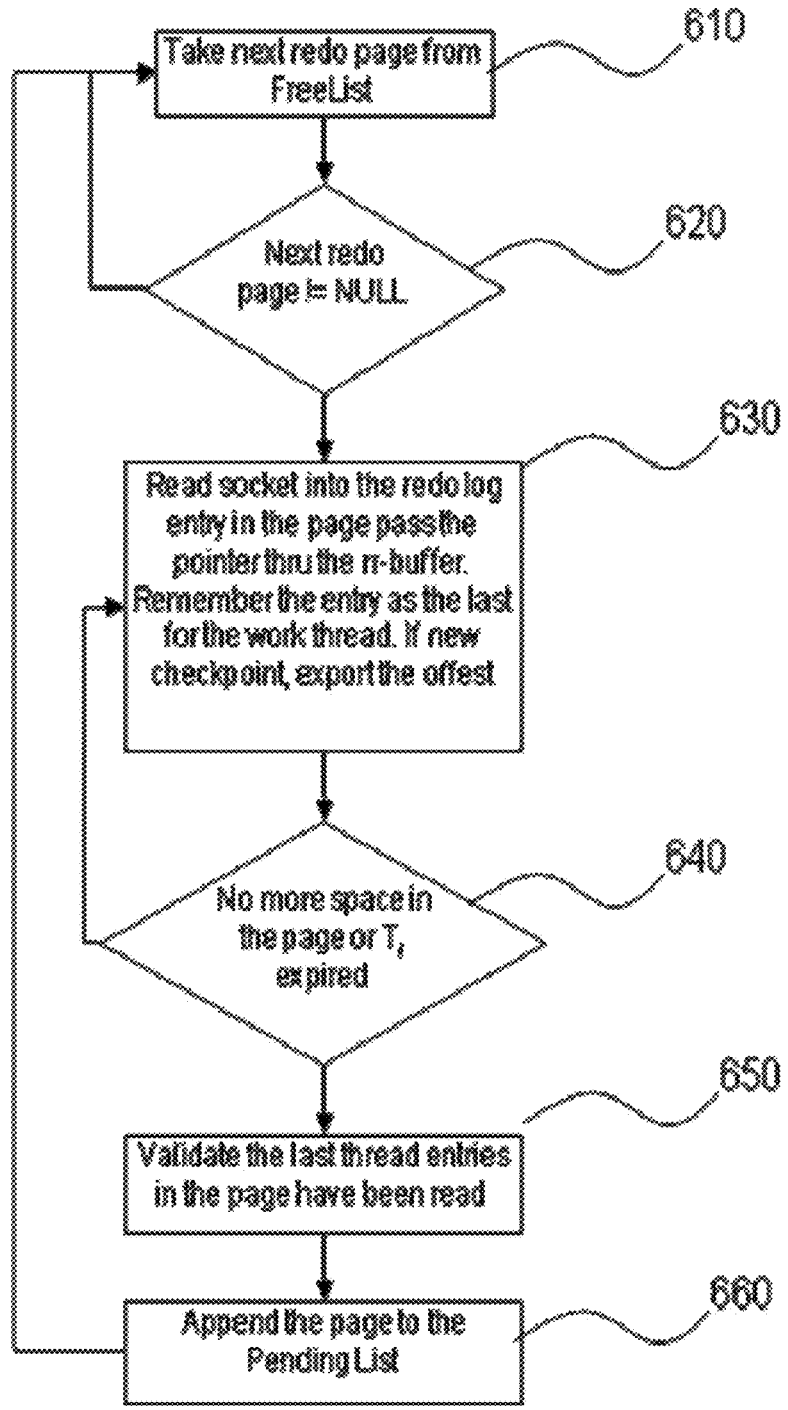
FIG. 6 schematically shows the processing of a communication unit in a data storage device according to an exemplary embodiment of the invention.

FIGS. 5 and 6 show an implementation of redo log design in an operational key-value store. In these figures, PendingList is a list of redo log pages and AvailablePages and SavedPages are the address spaces of a memory mapped filed as described with reference to FIG. 4.

FIG. 5 shows a flowchart of the logger thread. The thread waits on the PendingList and when non-empty removes a page from the list and persists it by means of a synchronization system call, for example msync( ).

In step 510, the next redo page is taken from the PendingList as long as there are redo pages, indicated by branching 520. Subsequently, the redo pages is synchronized, step 530 and appended to SavedPages, 540. In step 550, a new page is allocated from the available pages until no further pages are available, 560. In step 570, the new page is inserted into the FreeList and depending on whether or not the last checkpoint is done 580 either the SavedPages are returned to AvailablePages 590 or the next redo page is taken from the PendingList 510.

FIG. 6 shows a flowchart of the communication thread. The communication thread privatizes a redo log page from the FreeList. The page provides enough redo log space such that no frequent page allocation is needed. Having the needed space in the redo log entry the thread reads the update operation request in the page, remembering the entry as the last entry for the corresponding working thread. Upon space exhaustion or Tr timer expiration the communication thread validates that all the last entries in the page have been read. Thereafter, the thread appends the page to the PendingList and proceeds to the beginning of the loop.

In other words, in step 610 pages are taken from the FreeList until all pages are taken, 620. The socket is read into the redo log entry in the page and the pointer is passed through the buffer, 630. Further, in step 630 the respective entry is remembered as the last entry for the work thread. In case of a new checkpoint the offset is exported. This is repeated until no more space is available in the page or Tr expires, 640. In step 650 the communication thread validates that the last entries in the page have been read and append the page to the PendingList, 660.

What is claimed is:

1. A data storage device comprising:
   a first storage module configured to store a plurality of data sets;
   second and third storage modules;
   a control module in communication with the first, second and third storage modules and configured to (a) receive requests for operations to be carried out on the plurality of data sets in the first storage module, (b) execute the received requests and (c) copy the plurality of data sets in the first storage module to the second storage module at a predetermined time; and
   a buffer in communication with the controller;
   wherein the control module is further configured to:
   a) add the received requests for operations to the buffer;
   b) persist the buffer to the third storage module by way of synchronization;
   c) mark the requests for operations used for updating the third storage module;
   d) initialize the plurality of data sets in the first storage module from the second storage module; and
   e) carry out operations associated with the received requests from the third storage module in a recovery scenario.

2. The data storage device of claim 1, wherein the second storage module is configured to contain a persistent copy of a consistent state of the plurality of data sets at a plurality of predetermined points in time from the first storage module.

3. The data storage device of claim 1, wherein the control module is configured to receive requests for operations to be carried out on the plurality of data sets in the first storage module, to execute the received requests and to copy the plurality of data sets in the first storage module to the second storage module at a plurality of subsequent predetermined points in time.

4. The data storage device of claim 1, wherein the buffer is a circular buffer.

5. The data storage device of claim 1, wherein the buffer is configured to use same buffer cells for adding the received requests for operations to be carried out on the first storage module and for updating the third storage module.

6. The data storage device of claim 1, wherein the control module is configured to repeatedly update the data sets in the second storage module.

7. The data storage device of claim 1, wherein the control module is configured to verify whether an updating of the data sets in the second storage module is successful and to not mark the respective requests as updated in the second storage module in case the updating is not successful.

8. The data storage device of claim 1, wherein the data storage device is configured to update only those data sets in the second storage module on which an operation in the first storage module has been carried out.

9. The data storage device of claim 1, wherein the first storage module is a non-persistent storage module.

10. The data storage device of claim 1, wherein the third storage module is a persistent storage module.

11. The data storage device of claim 1, wherein the first storage module is configured to assign the plurality of data sets to a plurality of data set groups;
    wherein the data storage device comprises a plurality of buffers;
    wherein each one of the plurality of buffers is assigned to one data set group, respectively.

12. The data storage device of claim 1, wherein the data storage device is configured to restore the plurality of data sets in the first storage module based on the data sets of the second storage module and the requests contained in the third storage module.

13. The data storage device of claim 12, wherein only those of the requests contained in the third storage module are applied to the data sets in the first storage module which have not been updated to the second storage module.

14. A method for data storage comprising:
    storing a plurality of data sets in a first storage module;
    receiving requests for operations to be carried out on the plurality of data sets;
    executing the received requests;
    copying the plurality of data sets to a second storage module at a predetermined time;
    adding the received requests for operations to a buffer;
    persisting the buffer to a third storage module;
    marking the requests for operations carried out on the data sets in the first storage module used for updating the third storage module;
    initializing the plurality of data sets in the first storage module from the second storage module; and
    carrying out operations associated with the requests from the third storage module in a recovery scenario.

15. The method of claim 14, further comprising:
    containing a persistent copy of a consistent state of the plurality of data sets at a plurality of predetermined points in time from the first storage module.

16. The method of claim 14, further comprising:
    receiving requests for operations to be carried out on the plurality of data sets in the first storage module, to execute the received requests and to copy the plurality of data sets in the first storage module to the second storage module at a plurality of subsequent predetermined points in time.

17. The method of claim 14, further comprising:
using same buffer cells for adding the received requests for operations to be carried out on the first storage module and for updating the third storage module.

18. The method of claim 14, further comprising:
verifying whether an updating of the data sets in the second storage module is successful and stopping mark the respective requests as updated in the second storage module in case the updating is not successful.

* * * * *